March 20, 1945.　　C. B. DALZELL ET AL　　2,371,807

PASTEURIZING APPARATUS

Original Filed May 18, 1939　　2 Sheets-Sheet 1

INVENTOR.
Charles B. Dalzell
Raymond J. Neely
BY
Norman E. H. Weletzke
ATTORNEY.

March 20, 1945.   C. B. DALZELL ET AL   2,371,807
PASTEURIZING APPARATUS
Original Filed May 18, 1939     2 Sheets-Sheet 2

INVENTOR.
Charles B. Dalzell
Raymond J. Neely
BY Norman E. H. Peletzke
ATTORNEY.

Patented Mar. 20, 1945

2,371,807

UNITED STATES PATENT OFFICE 2,371,807

PASTEURIZING APPARATUS

Charles B. Dalzell, Little Falls, and Raymond J. Neely, Middleville, N. Y., assignors to Cherry-Burrell Corporation, Chicago, Ill., a corporation Original application May 18, 1939, Serial No. 274,408. Divided and this application April 28, 1943, Serial No. 484,846

4 Claims. (Cl. 257—2)

This invention relates to apparatus for heating and cooling liquids, such as liquid dairy products. More particularly this invention relates to pasteurizing apparatus of sanitary, compact construction provided with automatic means for controlling the temperature of the product being pasteurized, such as milk, cream, ice cream mix and the like.

This application is a division of our co-pending application, Serial No. 274,408, filed May 18, 1939, and entitled "Pasteurizing apparatus."

In a processing apparatus, such as constitutes the subject matter of the present invention, especially when intended for use in the pasteurization of a dairy product, such as ice cream mix, it is preferable that the material being pasteurized be quickly and uniformly heated and subsequently maintained at a predetermined desirable temperature for a given period of time without subjecting it to unnecessary fluctuation in temperature after which it is desirable to promptly and rapidly lower the temperature of the processed product. Such processing apparatus should, of course, be so constructed that all parts thereof are easily accessible for cleaning and inspection.

The prime objects of this invention are to provide an improved, inexpensive and sanitary processing apparatus comprising a receptacle having individually or concurrently operable heating, cooling and agitating means, thereby imparting flexibility thereto, and to provide in such pasteurizing apparatus automatic controls for the heat exchange system to regulate the quantity of heating medium applied to the processing receptacle.

Other important features of the invention will be apparent upon an examination of the details of construction and arrangement of the elements of the improved apparatus, all of which will be first fully described and then specifically pointed out in the appended claims, reference being made to the accompanying drawings in which:

Figure 3 is a side elevational view partially in broken-away section of the heat exchange medium drain including a liquid trap and thermosensitive unit.

Figure 1:
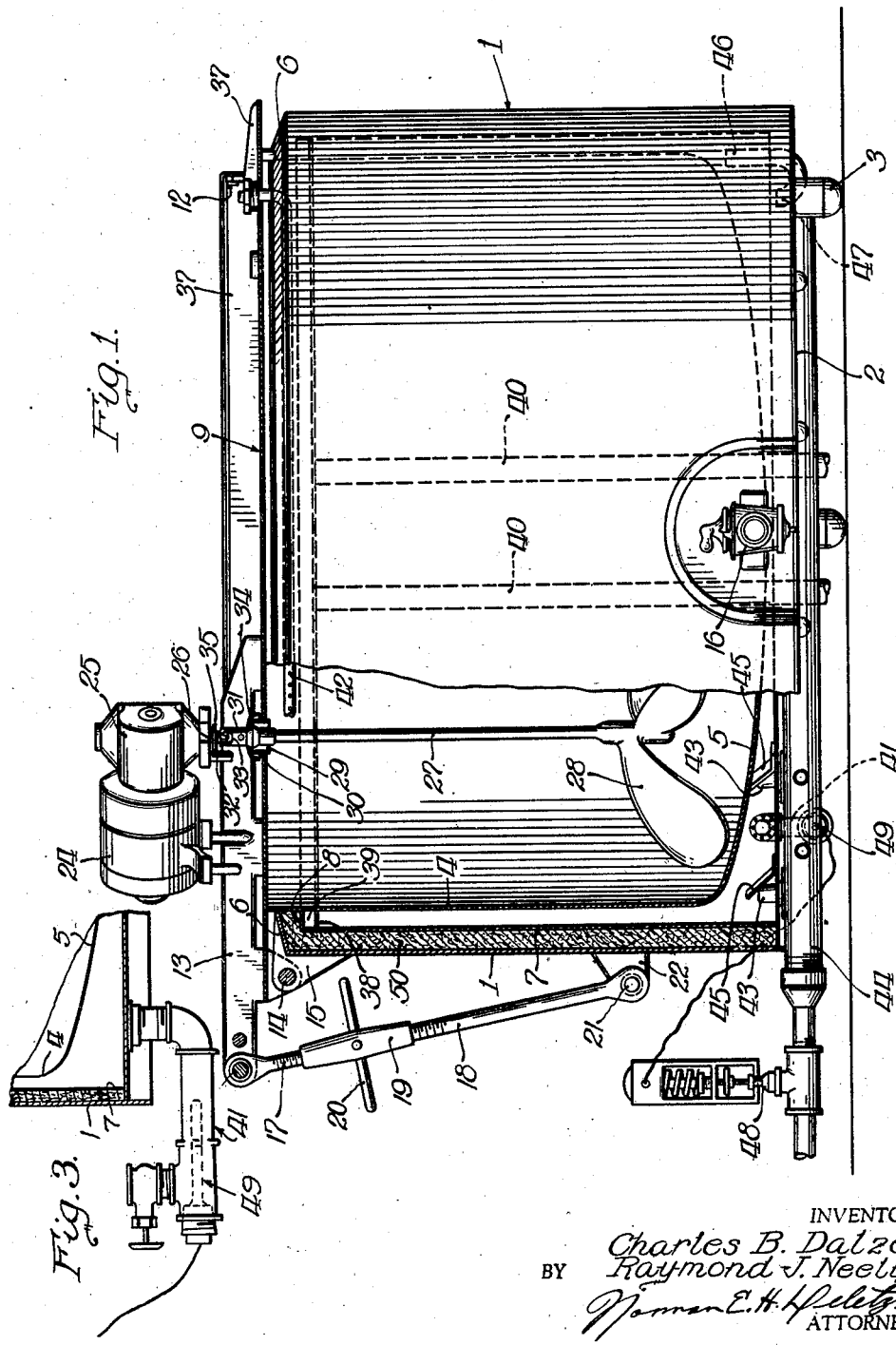
Figure 1 is a side elevational view, partially in broken-away section, of processing apparatus constructed in accordance with the preferred embodiment of the invention.
Figure 2:
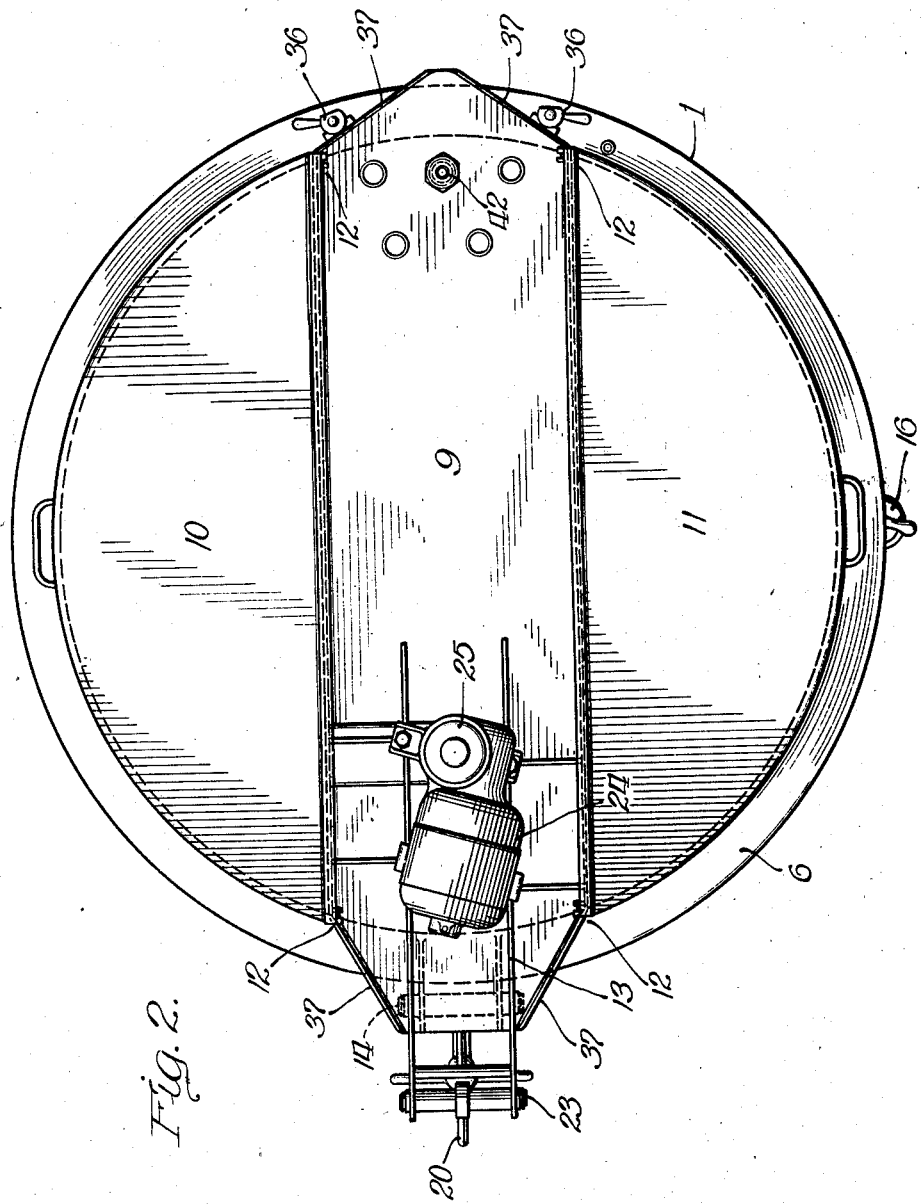
Figure 2 is a plan view of the improved processing apparatus.

Referring to the illustrations showing the preferred embodiment of the invention, in which illustrations like numerals are associated with like elements, the invention comprises an outer receptacle 1 of a cylindrical vertical type having a large open top and a flat bottom 2 and supported in a conventional manner on supports 3.

Within the receptacle 1 is an inner cylindrical vertically positioned receptacle 4 also having a large open top and a dished bottom 5.

The inner receptacle 4 with its dished bottom 5 is spaced from the receptacle 1 to form a space of substantially uniform width intermediate the side walls of the inner and outer receptacles 4 and 1, respectively. The inner receptacle 4 is maintained in fixed position within the outer receptacle 1 by an annular sealing and supporting ring-like member 6 joined to the tops of the two receptacles 1 and 4 in any conventional manner, such, for example, as by welding, and thereby also sealing the top of the space intermediate the two receptacles.

To insulate the inner receptacle 4 a shell 7 is provided intermediate the vertical side walls of the receptacles 1 and 4 with the lower edge of the shell 7 sealed to the bottom of the outer receptacle 1 by any conventional arrangement, such, for example, as welding, and having the top edge thereof, which is slightly lower than the top edges of the receptacles 1 and 4 joined to the outer edge of the inner receptacle 4 by a horizontal ring-like element 8 welded to the top of the shell 7 and to the outer periphery of the receptacle 4 slightly below the supporting ring-like member 6. The space confined between the shell 7 and the outer receptacle 1 is filled with any suitable insulating material 50 to effectively insulate the inner receptacle 4 and the space intermediate the receptacles 1 and 4.

It is, of course, obvious that the outer receptacle could be so constructed that the vertical walls would consist of the shell element 7 which is welded to the bottom 2 and that the present vertical wall of the outer receptacle 1 would consist of a jacket element rigidly fixed to the receptacle 1 and shell 7, as now shown, merely to constitute a confining means for the insulation 50.

The liquid to be processed is normally supplied through the open top to the inner receptacle 4 in which it is to be processed. The open top is normally enclosed by a sectional closure comprising a central closure element or bridge 9 and sectional elements 10 and 11 hinged to the central element 9 along their adjoining surfaces by any conventional type of easily detachable hinge, as shown and generally indicated by the numeral 12.

To enable the ready inspection and cleaning of the interior of the receptacle 4 the sectional closure bridge 9 is mounted on one end of a hinged bracket 13 fixed to the central closure element 9 in any conventional manner, such, for example, as by welding. The bracket 13 is hinged intermediate its ends by a pivot 14 to a second hinged bracket 15 carried on the outer surface of the outer receptacle 1 close to the top thereof.

By this arrangement the entire closure assembly consisting of the central bridge element 9 and sectional elements 10 and 11 may be freely oscillated individually or as a unit comprised of all three sections by partially rotating the bracket element 13 about the pivot 14, thereby making the interior of the inner receptacle 4 freely accessible for cleaning and inspection. The liquid processed in the receptacle 4 may be readily withdrawn therefrom through an outlet valve communicating with the lower portion of the interior of the inner receptacle 4, which valve is indicated generally by the numeral 16.

The convenient oscillation of the sectional closure is made possible by the use of a turnbuckle comprising screw elements 17 and 18 and a coupling or buckling element 19. Hand grips 20 are provided on the outer periphery of the buckle element 19 and the free end of the screw element 18 is pivoted by the pivot pin 21 to a bracket 22 fixed to the outer receptacle 1. The free end of the screw element 17 is pivoted by a pin 23 to the free end of the bracket 13.

To permit the agitation of the contents of the receptacle 4 an agitator assembly is supported on the bracket 13. The agitator assembly comprises a power unit 24 mounted on the bracket 13 on the outside of the closure bridge 9, which unit comprises an electric motor provided with an agitator drive 25 having a vertical drive shaft 26 in vertical, axial alinement with the shaft 27 for the agitator 28.

The agitator shaft 27 extends upwardly from the interior of the receptacle 4 through an aperture 29 in the closure bridge 9 directly below the end of the drive shaft 26. The aperture 29 is preferably defined by a tubular element 30 permanently fixed to the closure bridge 9 and having flanges comprised of the ends of the tubular element 30 extending above and below the closure bridge 9.

The drive shaft 26 is detachably coupled to the agitator shaft 27 by a bayonet joint or coupling formed by the sleeve 31 permanently fixed to the upper end of the agitator shaft 27 and projecting upwardly therefrom to form a cylindrical socket adapted to receive the lower end of the drive shaft 26. The drive shaft 26 is provided with one or more radial studs 32 to engage an angular slot or slots 33 in the sides of the sleeve 31. The slots 33 have an upwardly extending inner end portion into which the studs 32 seat to support the agitator and agitator shaft 27 when coupled together. The axial alinement of the shaft 27 and drive shaft 26 is made possible by the close bearing-like fit of the sleeve 31 over the end of the drive shaft 26 to which the shaft 27 is coupled by a bayonet joint as just described.

To prevent the passage of condensate or other foreign matter, such as oil and grease, from the drive mechanism into the receptacle 4 through the opening 29, a centrally apertured bonnet-like shield 34 is provided. To further guard the aperture 29 in the closure bridge 9 and also to guard the greatly reduced aperture in the shield 34, a fixed disk-like guard 35 is permanently mounted on the drive shaft 26 constituting a guard to prevent the possible drainage of oil or other foreign matter from the drive shaft 26 into the receptacle 4 through the apertures in the closure 9 and the shield 34 when the agitator shaft 27 is removed.

The detail construction of the lock nuts 36 for securing the bridge 9 may be of any conventional arrangement commonly in use for similar purposes.

The sections 10 and 11 are hinged to the adjoining edge of the central bridge 9 having downwardly turned edges overlapping upwardly turned edges 37 on the central bridge 9, as clearly shown in the figures. The upwardly turned edges 37 on the sides of the bridge 9 extend outwardly over the edges of the outer receptacle 1 on the extended ends of the bridge 9 which also extend out over the edge of the receptacle 1.

The apparatus, as shown, may be used as a pasteurizer involving the heating, cooling or recooling and concurrent agitation of the liquid contained in the processing receptacle or it may be used to accomplish any one of these operations singly or in any desired sequence.

To cool the contents of the inner receptacle 4, film type cooling is employed utilizing a film forming assemblage consisting of an annular horizontal baffle and film distributing element 38 of a width slightly less than the width of the space intermediate the receptacle 4 and the shell 7 and welded to the inner surface of the shell 7 slightly below the ring-like element 38 which joins the top of the shell 7 to the receptacle 4. This arrangement of parts provides an annular cooling passage 39 intermediate the elements 8 and 38, shell 7 and receptacle 4 having a slot intermediate the receptacle 4 and the adjacent edge of the element 38.

Cooling fluid conduits 40 which communicate with the annular space 39 are adapted to supply cooling liquid thereto. From the space 39 the cooling liquid is distributed in a thin film on the upper portion of the outer surface of the receptacle 4 flowing downwardly over the vertical walls of the receptacle 4 and the dished bottom 5 thereof from whence it drops away from the receptacle 4 onto the bottom 2 of the receptacle 1. The cooling fluid is drained from the bottom of the receptacle 1 through the drain 41.

The heating system of the pasteurizer comprises two separate heating arrangements. The space intermediate the fluid being processed in the receptacle and the closure for the top of the receptacle is separately heated by the direct introduction of steam or other gaseous heating medium into that space by means of the apertured conduit 42 carried by the bridge 9 below the same and entering the space through an aperture in the bridge. The conduit 42 is suspended from the bridge 9 entirely above the level of the liquid in the vat 4 and extending longitudinally below the central portion of the bridge 9 from the free end thereof toward the hinged end thereof.

The heating medium entering through the conduit 42 is not introduced directly into the liquid being processed in the vat. Suitable connections to supply the steam or other heating medium to the conduit 42 may be made in any suitable manner. Other apertures are provided in the hinged closure bridge 9 for the insertion of suitable thermometers and fluid supply conduits, all of which may, of course, be accomplished in the conventional manner.

The heating system for the main body of the liquid to be processed comprises a series of upwardly directed steam jets 43 mounted on the bottom 2 of the outer receptacle 1 and arranged in a substantially circular manner approximately under the vertical wall of the cylindrical inner receptacle 4. Each of the steam jets 43 communicates with a steam supply conduit 44. Steam is supplied through the jets 43 to the space intermediate the shell 7 and the inner receptacle 4, thereby heating the contents of the receptacle by the prompt and direct contact of steam and steam condensate with the outer surface of the receptacle 4.

To prevent the localization of heat in the receptacle 4 immediately adjacent the discharge orifices of the various steam jets 43, which localization would normally result from the direct impinging of the steam against the vat 4, to diffuse and distribute the steam to permit the uniform condensation thereof upon the outer surface of the inner vat, and to prevent the rapidly moving steam from urging the condensate away from certain portions of the outer surface of the inner receptacle 4, deflecting baffles 45 are provided which are positioned adjacent each orifice 44 in overlapping relation to deflect, distribute and diffuse the steam entering through the orifices.

The inner vat or processing receptacle, which is normally filled with cool liquid to be pasteurized at the beginning of the operation period, is heated by the condensed steam on the outer surface of the inner vat. The condensed steam is conducted from the space intermediate the shell 7 and the receptacle 4 through the drain 41 to prevent the development of excessive pressure in the heating space. A vertical pipe 46 is positioned in the bottom 2 of the outer receptacle 1 and is provided with an upwardly turned element 47 on the outer end thereof in which may be produced a liquid seal, thereby preventing the entrance of cool air therethrough or the ready escape of steam therethrough except in such instances in which sufficient pressure is developed within the heating space to expel the liquid seal from the pipe 46 and the upwardly turned element 47.

It is, therefore, obvious that during the normal operation of the herein described pasteurizer, when it is desired to pasteurize liquid, such as ice cream mix or similar dairy products, the cool liquid is introduced into the inner pasteurizing receptacle 4, resulting in the chilling of the receptacle. Steam is then introduced into the space between the lining or inner receptacle 4 and the insulated jacket 7 through the series of nozzles 43 and is distributed and diffused uniformly through the said space. The steam is prevented from directly impinging against the outer surface of the inner receptacle 4 by the deflecting, diffusing and distributing baffles 45.

The steam quickly condenses on the outer surface of the inner receptacle 4 forming a film of condensate thereon which drains downwardly over the dished bottom 5 thereof and into the bottom of the outer jacket 7 from whence it enters the drain conduit 41. The condensate which has thus been cooled by draining over the cool outer surface of the inner receptacle 4 quickly fills the liquid trap in the drain conduit 41, thereby completely surrounding with cool condenate the sensitive thermal unit 49 housed in the liquid trap.

By this procedure direct contact of steam or hot water with the sensitive thermal unit positioned in the drain conduit is prevented until the temperature of the unit in the inner receptacle 4 is sufficiently increased as not to chill or substantially cool the condensing steam. At such time the condensate entering the liquid trap may be warm enough to effect the operation of the thermal unit housed therein or the steam pressure may sufficiently increase within the space intermediate the inner pasteurizer receptacle and the insulated jacket due to the lack of condensation when the temperature of the material within the vat has been sufficiently raised to cause the pressure of the steam to expel the liquid seal from the trap within the drain pipe 41. This operation will permit the direct contact of steam or hot condensate with the sensitive thermal unit 49 which will effect the closing of the steam supply valve 48.

In the heating of the liquid in the manner just described it has been found by experimentation that a certain relation exists between the temperature of the condensate or mixture of condensate and steam draining through the drain 41 and the temperature of the liquid being processed in the receptacle 4. When the liquid being processed is cold the condensate will normally be substantially cooler than when the liquid being processed has been substantially raised in temperature. It is, of course, needless to say that the temperature of the condensate would also have a relation to the quantity of steam being supplied to the heating chamber.

One of the advantages of the temperature and control arrangement embodied in the presently described construction, particularly in the practical operation thereof, is the resulting capacity to properly process the product and the adaptability of the device to regulate the quantity of steam supplied to the heating chamber in such a manner as to prevent the normal passage of uncondensed steam through the drain pipe 41. To enable the automatic control of the quantity of steam supplied to the heating space, which quantity so supplied, together with the temperature of the product being processed, directly determines or controls the temperature of the effluent or condensate or mixture of condensate and steam draining through the drain 41, an automatic control valve identified by the numeral 48 is provided. The automatic control valve 48 is responsive to the temperature of the effluent or condensate or mixture of condensate and steam draining through the drain 41, and more particularly the valve 48 is responsive to the temperature of the liquid in the liquid seal or liquid trap of the drain 41, which responsiveness is obtained by means of the use of a thermal control unit 49, the thermal sensitive end of which extends into the liquid seal or trap in the drain 41.

The automatic control valve 48 is positioned in the steam supply line 44, thereby automatically controlling the quantity of steam supplied to the heating space. It is, of course, obvious that the degree of control effected by the valve 48 may be varied substantially, depending on the specific type of thermal responsiveness desired and the characteristics of the control units employed.

The specific disclosure shown in the drawings includes a type of valve which is only roughly adjustable and is either completely open or completely closed. By such an arrangement, as soon as a quantity of steam supplied to the heating space is in excess of that which can be condensed on the surface of the receptacle 4, live steam or a mixture of condensate and steam will drain through the drain 41 expelling the liquid seal therefrom and bringing the live steam in contact with the thermal responsive unit. Such contact of live steam with the thermal responsive unit for the valve 48 will promptly close the valve 48, thereby preventing the possible overheating of the product in the receptacle 4. As long as live steam or hot liquid flowing through the liquid seal does not contact the thermal unit 49 or is not hot enough to actuate the thermal unit it is quite certain that the product in the receptacle 4 has not been overheated.

By this arrangement the quantity of steam introduced into the heating space and, therefore, also the quantity of heat imparted to the product being processed is automatically controlled by the reaction of the thermal unit 49 to the temperature of the fluid draining through the drain 41 whether it be liquid or gas. In this particular instance it is contemplated that the thermal unit has been so adjusted that it will react only to the temperature of liquid which closely approaches the temperature of live steam. Live steam will come in contact with the unit 49 only upon the introduction of a sufficient quantity thereof into the heating chamber to expel the liquid seal from the drain 41.

The construction of a pasteurizing or processing apparatus, as has just been described, comprises a machine of great operative flexibility. The machine can be used separately for heating, cooling, holding or for simply agitating the product within the processing receptacle without the heating or cooling thereof. The apparatus may also be used for any desired sequence of heating, cooling, holding and agitating operations. The inventive characteristics of the preferred embodiment of this invention are, however, chiefly comprised of the afore-described temperature control arrangement and the manner of operation thereof.

The embodiment of the invention just described is the preferred embodiment. However, it should be understood that the invention may be embodied in various other devices. The invention should not be limited to the specific embodiment disclosed in this application or the details thereof.

The invention is hereby claimed as follows:

1. A device of the class described comprising, in combination, a receptacle for containing a liquid to be processed, an enclosed space encompassing said receptacle for normally confining condensable heat exchange medium in heat exchange relation with said liquid through said receptacle, a discharge conduit having a liquid seal and communicating with said space for normally conducting effluent therefrom, condensable heat exchange medium supply means communicating with said enclosed space for circulating condensable heat exchange medium therein in heat exchange relation with said liquid through said receptacle, and valve means responsive to thermosensitive means for regulating the circulation of the heat exchange medium when the quantity of condensable heat exchange medium supplied to said space is substantially in excess of that which is readily condensable on said receptacle due to the heat exchange effected with said liquid, whereby pressures in excess of the tolerance of said liquid seal will be developed in said enclosed space by said condensable heat exchange medium, the development of the excessive pressures acting indirectly through said thermo-sensitive means to stop said supply of condensable heat exchange medium.

2. A device of the class described comprising, in combination, a vat adapted to receive a product to be processed, said vat forming a portion of a wall of an enclosed space, in which space condensate collects in contact with the surface of the vat for heating the contents of the vat and immediately drains from said surface into a sump below the vat and out of contact with said vat, conduit means for supplying a condensable heating medium into said space, draining means for discharging condensate from said sump, sealing means in said draining means adapted to receive liquid to effect a seal, a thermal unit in said draining means extending into said sealing means, and a valve in said conduit means, said valve being responsive to said thermal unit and adapted to control the flow of heating medium through said conduit means, whereby upon the expulsion of liquid from said sealing means condensable heating medium will be permitted to directly engage said thermal unit to effect the closing of the valve in said conduit means.

3. A device of the class described comprising, in combination, a vat adapted to receive a product to be processed, said vat forming a portion of a wall of an enclosed space, in which space condensate collects in contact with the surface of the vat for heating the contents of the vat and immediately drains from said surface into a sump below the vat and out of contact with said vat, conduit means for supplying a condensable heating medium into said space, draining means for discharging condensate from said sump, sealing means in said draining means adapted to receive liquid to effect a seal, a thermal unit in said draining means extending into said sealing means, and a valve in said conduit means, said valve being responsive to said thermal unit and adapted to control the flow of heating medium through said conduit means, whereby the flow of heating medium into said space is stopped upon the expulsion of liquid from said sealing means permitting the heating medium to directly contact the thermal unit and the flow of heating medium is started upon the sealing means again receiving sufficient liquid to effect a seal and prevent the direct contact between the heating medium and the thermal unit.

4. A device of the class described comprising, in combination, a container adapted to receive a product to be processed, a jacket substantially enclosing said container and spaced therefrom and sealed thereto, said jacket and said container forming therebetween a heat exchange medium circulating space, a sump in said jacket for collecting condensed heat exchange medium out of contact with said container, a conduit means for supplying condensable heat exchange medium into said space, discharge means for discharging the heat exchange medium from said sump, sealing means in said discharge means adapted to receive condensed heat exchange medium to effect a seal, a thermal unit in said discharge means extending into the seal formed by said condensed heat exchange medium, a valve in said conduit means, said valve being operatively connected to and responsive to said thermal unit and adapted to control the flow of heat exchange medium through said conduit, whereby upon a predetermined increase in the temperature of the heat exchange medium surrounding the thermal unit in said discharge means said thermal unit will effect the closing of said valve in said conduit means.

CHARLES B. DALZELL.
RAYMOND J. NEELY.